H. C. EVANS.
MACHINES FOR WELDING METAL-TUBING.

No. 193,400. Patented July 24, 1877.

Witnesses:
D. P. Cowl
M. E. Chaffer

Inventor:
Henry C. Evans
by Bakewell & Kerr
attys

UNITED STATES PATENT OFFICE.

HENRY C. EVANS, OF PITTSBURG, PENNSYLVANIA.

IMPROVEMENT IN MACHINES FOR WELDING METAL TUBING.

Specification forming part of Letters Patent No. 193,400, dated July 24, 1877; application filed May 4, 1877.

*To all whom it may concern:*

Be it known that I, HENRY C. EVANS, of Pittsburg, in the county of Allegheny and State of Pennsylvania, have invented a new and useful Improvement in Machines for Welding Metal Tubing; and I do hereby declare the following to be a full, clear, and exact description thereof, reference being had to the accompanying drawing, forming part of this specification, in which—

Figure 1:
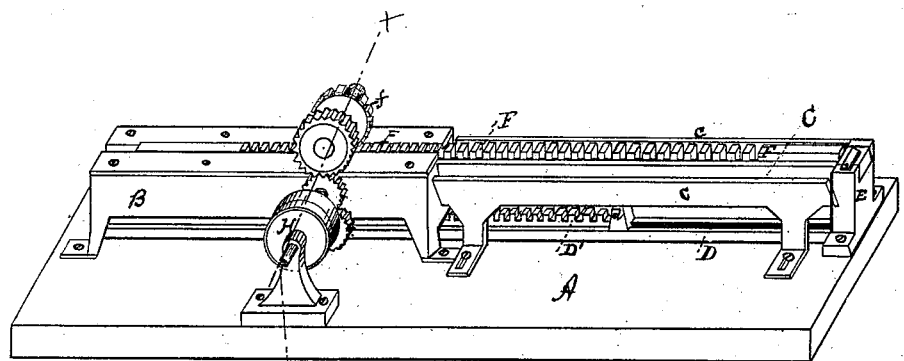
Figure 5:
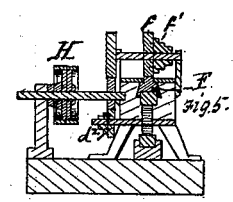
Figure 2:
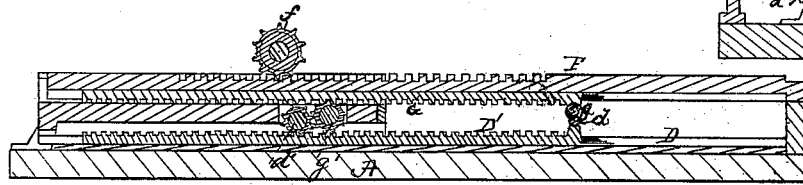
Figure 3:
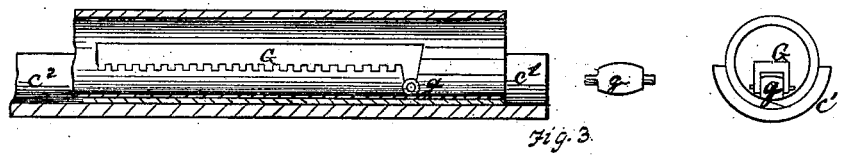
Figure 4:
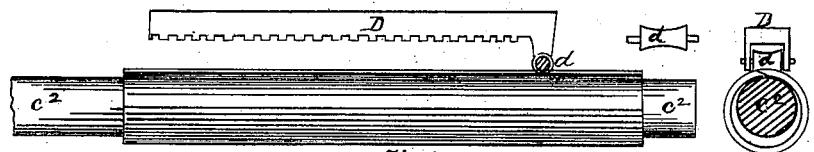

Figure 1 is a perspective view of a machine embodying my invention, the bearing or brace bar being in position to sustain the arm of a welding-roll during the operation of welding. Fig. 2 is a longitudinal vertical section of the same, the arms or carriers of the welding-rolls being advanced about half-way of their travel. Fig. 3 is a diagram illustrating the use of the inner welding-roll and its carrier when employed with a solid trough. Fig. 4 is a diagram illustrating the employment of a single carrier and welding-roll with a mandrel. Fig. 5 is a transverse section of the machine shown in Fig. 1, on the line $x\ x$ thereof.

Like letters refer to like parts wherever they occur.

My invention relates to the construction and operation of machinery for welding tubing of either equal diameter throughout or tapering and of any desired size.

I will now proceed to describe my invention, so that others skilled in the art to which it appertains may apply the same.

In the drawing, A indicates a suitable bed-plate, on which is erected a main frame, B, for the operative mechanism. In line with the main frame B is arranged a trough, C, composed of two side pieces, $c\ c$, so as to obtain a slotted or open bottom, said side pieces being, if desired, secured to the bed-piece A by slotted feet and set-screws, so as to be adjusted to or from a central line, to adapt the trough to different-sized or tapering tubes.

Secured longitudinally in the bed-plate A, at or near the base thereof, and projecting along the central line of trough C, is a fixed brace and guide-bar, D, supported at its outer end by a standard, E, secured to the bed-plate. This bar D serves as a support and guide for a rack-bar or carrier, D′, at or near the outer end of which is journaled one or more welding-rolls, $d$. Movable in guides in the upper part of frame A is a second or movable brace and guide-bar, F, sometimes termed a "plunger," having a rack upon its upper surface, adapting it to be operated by a pinion, and upon or formed in the bar are guides or ways for a second rack-bar or carrier, G, provided with a welding roll or rolls, $g$. The upper brace or guide-bar is made movable, in order that it may be withdrawn to place a pipe-skelp in position in the trough, and is afterward advanced through the bent skelp and its outer end secured to the standard E by a slide, button, or pin, so as to fix the brace-bar or plunger G during the travel of the upper welding-rolls.

The welding-rolls $d\ g$, &c., will of course be adapted in form to the work they are to do. In the present instance the roller $d$, which is to travel on the exterior of the tube, is shown as concave, while the roller $g$, which traverses the interior of the tube, is convex.

The movable plunger or brace-bar F and the rack-bars or carriers D′ G are actuated by pinions journaled on the frame A, the bar F having an independent motion by means of a loose pinion, $f$, and clutch $f'$, and the carriers D′ G being caused to move together by pinion $d^1\ g'$, controlled by a clutch, $d^2$, the whole mechanism being operated by any suitable power, through pulley H.

The open trough and exterior and interior traversing rolls (shown in Figs. 1 and 2) are the preferred devices; but in some instances a solid or close bottom trough (shown in Fig. 3, $c^1$) may be employed, in which case the exterior welding-roll and its carrier will be dispensed with, and in other cases a mandrel ($c^2$, Fig. 4) may take the place of the trough and support the skelp to be welded, in which case the exterior traversing roll and its carrier alone will be employed with the movable plunger or brace-bar F, and suitable mechanism to operate the same; but I do not now regard either modification as desirable as the construction shown.

The operation of these devices is as follows: The skelp, which has been bent in a suitable die, and brought to a welding heat along the lap by means of a furnace of well-known construction for the purpose specified, is placed in slotted trough C, or in a solid trough, Fig.

3, or on a mandrel, Fig. 4, according to circumstances, and arranged so that the lap is in the path of the traveling rolls. The clutch $f'$ is forced on loose pinion $f$, and (the pinions $d^1$ $g'$ being loose) power is applied, causing the brace-bar or plunger F to advance through the tube-skelp until its extremity rests in and is secured to standard E, after which the pinion $f$ is released and the clutch $d^2$ actuated to seize its pinion, and, through the pinions $d^1$ and $g'$, cause the advance of the rack-bars or carriers D' G, the welding-rolls $d$ $g$ thereof operating to weld the lap, and being kept from springing and held down to their work by the brace-bars D and F. The travel of the carriers is finally reversed, and when they have been withdrawn from the welded tube, the plunger or brace-bar F is withdrawn and the pipe removed to make place for a fresh tube-skelp, whereon the welding operation is repeated.

The advantages of a machine embodying my invention are, first, metal tubing of any medium or large size, and any required taper, can be produced with great facility, and, also, that the variations of sizes within the range of a single machine (with slight changes in detail) reduce greatly the space and capital required for machinery.

Having thus described my invention, what I claim, and desire to secure by Letters Patent, is—

1. The combination, in a pipe-welding machine, of the movable plunger or brace-bar with the traveling welding-tool and the skelp-rest, substantially as and for the purpose specified.

2. The combination, in a pipe-welding machine, of an open-slotted bottom trough or pipe-rest, two traveling welding-rolls, and a movable plunger or brace-bar, substantially as specified.

3. The combination, in a pipe-welding machine, of a pipe-rest, the movable rack brace-bar, the rack-bar for carrying the welding-roll arranged in guides on the brace-bar, and gearing, substantially as described, for operating the rack-bars, as and for the purpose specified.

In testimony whereof I, the said HENRY C. EVANS, have hereunto set my hand.

HENRY C. EVANS.

Witnesses:
JAMES I. KAY,
L. C. FITLER.